June 27, 1972 M. LEVY 3,672,766

COLOR PRINTING METHOD

Filed April 15, 1971

INVENTOR.
MARILYN LEVY

BY: Roy E. Gordon AGENT
Harry M. Saragovitz, Edward J. Kelly & Herbert Berl
ATTORNEYS 3,672,766
COLOR PRINTING METHOD
Marilyn Levy, Red Bank, N.J., assignor to the United States of America as represented by the Secretary of the Navy
Filed Apr. 15, 1971, Ser. No. 134,298
Int. Cl. G03b 27/76
U.S. Cl. 355—32 2 Claims

ABSTRACT OF THE DISCLOSURE

The correct color balance required for making color prints in color photography from a color negative is determined by printing the clear, unexposed, but processed portion of the negative with the correct filtration so as to yield equal densities in the print to red, blue, and green light.

Figure 1:
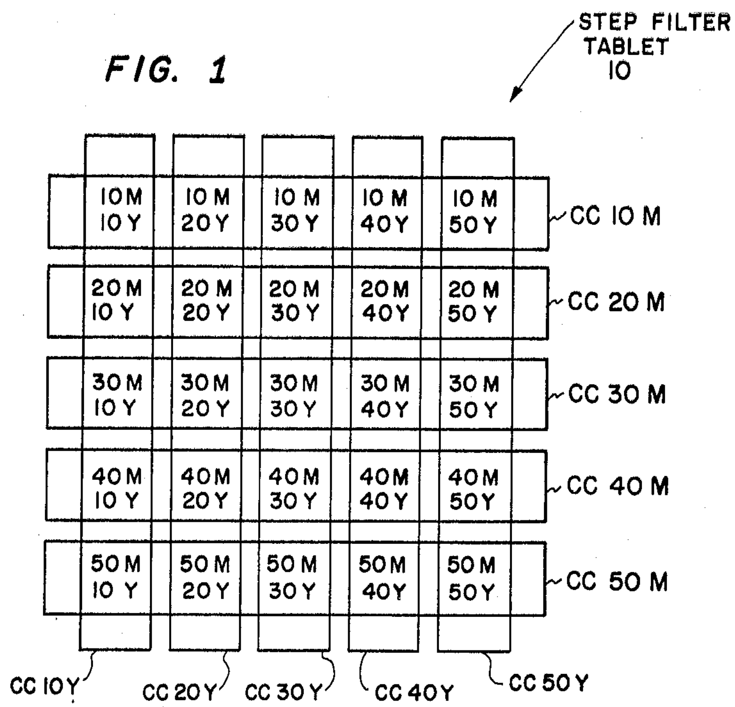

This invention relates to a method of determining the correct color balance for making color prints in color photography from color negative(s).

BACKGROUND OF THE INVENTION

In order to make an enlarged print in black and white photography, the photographer need only place the negative in the enlarger and with a simple exposure of light onto a printing or transparent material he can form the correct image on the paper. If the same technique is used for a color negative, the print produced will not have the correct color balance. The color temperature of the light of the enlarger; the color balance of the paper; and the color balance of the negative itself; all effect the appearance of the print. The color balance of the films and paper can differ markedly with manufacturer and can even vary from batch to batch of emulsion of the same manufacturer. This balance can also be changed by the method of processing used: the chemistry of the developer formulation; the time of development of negative and paper; slight variations in temperature of processing, etc. The light that comes through the negative onto the printing material must also be modified to correct these color distortions.

It is known that the color balance of the exposing light source can be changed with color filters. If, for example, the first trial print produced has a yellowish cast, it means that too much blue light has reached the yellow dye forming layer of the paper. (The yellow dye is formed by the blue light). The correct for this, one must hold back some of the blue light in the enlarged. This can be done with a yellow filter that absorbs blue light. Similarly, a magenta cast in the print means that the layer forming the magenta dye (the green sensitive layer) has received too much green light. This can be corrected by adding magenta filters to the enlarger head, thus holding back the green light exposure. In practice, a color cast is removed by a filter of the same color. Filters are made of varying transmittance so that one can hold back varying percentages of green or blue light. As an illustration, the following CC or color compensating magneta filters are available:

| Filter: | Percent transmission 530 millimicrons |
|---|---|
| CC05M | 81.8 |
| CC10M | 73.7 |
| CC20M | 60.5 |
| CC30M | 48.6 |
| CC40M | 39.0 |
| CC50M | 31.9 |

The procedure used for making a properly balanced color print is a trial and error one and consists of trying different combinations of CC yellow and CC magenta filters until the correct balance is obtained. The decision of the color cast in the print requires som experience in judging color. In addition the selection of the proper amount of filtration is complicated by the fact that the yellow filter absorbs some green light and the magneta filter absorbs some yellow light. For the first trial, the operator usually puts a 50M and 50Y filter in the enlarger and exposes the negative at varying *f*/stops. The prints are then processed and dried and examined visually for color balance. The operator must then determine what color cast is in the print and estimate how much filtration should be tried for the next trial print. He bases his estimate on his subjective idea of the color of flesh tone, or on some object in the picture that he assumes to be grey. If he decides on the wrong color for the flesh tone, he can never duplicate the original color of the rest of the scene, as for example, the persons clothing, the background, etc. The experience operator migh be able to make a good print after about 4 trials, but an inexperienced operator might have to make 15 to 20 prints before the correct color balance is obtained Since the processing time wet to wet is ½ hour plus 5 minutes for ferrotype drying, a minimum of 3 hours is required for the experienced operator to obtain the correct color balace. (Transparencies require even more time; 1-hour for processing and about 15 minutes for drying). During that time the processing solutions can become oxidized, and the color characteristics of future prints may be changed. Photometers, densitometers and negative analyzers and translators varying in price from 150 dollars to 25,000 dollars have been recommended by manufactureres, but in all cases the instruments must be calibrated with a standard negative and a color pack of filters determined by trial and error to give an acceptable print. The system is thus only calibrated for one kind of negative on one kind of paper for one kind of processing for one kind of enlarger, as for example, Ektacolor or Ektacolor printpaper. If the operator wanted to make a print of Ektacolor on Agfa paper or an Ektacolor transparency material, he would have to recalibrate the system. Another system of color printing is known as the additive color system. In this method exposure is made through blue, green, and red filters in separate exposures to expose the blue sensitivce, green sensitive and red sensitive layers. Adjustment of the relative times of exposure through the 3 different filters is made to determine the correct color balance. All of the methods of color negative evaluation currently in use that are based on a negative standard, compare the relative red, green, and blue light transmitted by a reference area of a "standard" negative with that of the unprinted negative. The reference area of the "standard" negative can be a grey card included in the picture, a flesh tone, or some area in the scene, as for example, a strip of concrete that is considered neutral. The filter combination for exposure is then determined that will give the selected grey, flesh or cement color in the print. The color of the reference area in the standard print is selected according to the subjective judgment of the person who is making the print. Alternatively, he can attempt to match the color to some standard print produced by the manufacturer that contains grey or flesh colors. In order to determine the balance of the unprinted negative, the printer then compares the relative amounts of blue, red, and green light transmitted in the reference area of the unprinted negative with that of the master negative. Color filters are then added or subtracted until both negatives transmit the same amounts of blue, red and green light. The difficulty with this system is that the print that is reproduced does not record faithfully the colors of the original scene. If the reference standard is a flesh tone, this system insures that all subsequent negatives containing flesh tones will be reproduced alike regardless of the flesh tone of the original subject. If the flesh tone of the original subject was different in true life, then matching to the standard will necessarily distort the color of the surrounding areas. Similarly, a grey card in the scene recorded by the unprinted negative may have been illuminated by a yellowish light and if it were to be recorded true to nature, it should be recorded as a yellowish-grey. The grey of the standard, however, might have been a bluish grey and therefore the new negative would have been printed as a blue-grey to match the standard. Since the new negative recorded the card as a yellow-grey image, any attempts to convert the reproduction of the card as a blue-grey would necessarily throw a bluish cast over the entire scene.

In addition, it is not always feasible to include a grey card in the scene or to record it so that the image size is large enough to read in a densitometer. As an example, a 5 x 8 inch grey card is reduced to an image 4 mm. by 2 mm. when it is photographed at a distance of 7 feet with a 50 mm. lens. Most densitometer probes are larger than this and therefore an accurate determination of density could not be made. When there is no suitable reference area on the negative, the manufacturers recommend the use of an integrated density of a large portion of the negative. This method gives faulty results especially when there is a preponderence of a particular color in the negative as for example, when photographing a figure in a bright red dress.

SUMMARY OF THE INVENTION

The general object of this invention is to eliminate the problems and inaccuracies in printing resulting from the subjective analysis of color described above, and to devise a method that will insure that the true color relationship recorded by the color negative(s) is transferred to the positive paper print or transparency. Another object of this invention is to determine by an accurate and simple method the amount of filtration that is necessary to use when exposing color negative(s) so as to eliminate any interfering color cast. It is a further object of this invention to provide a method that will eliminate the necessity for using the exposed and processed negative or master negative in determining the correct color filtration.

According to this invention, the correct color balance can be easily and accurately obtained by the simple operation of printing the unexposed, but processed portion of the negative with the correct filtration so as to yield equal densities in the print to red, blue, and green light, in other words to produce a grey image by exposure of the unexposed, processed portion of the film. The invention is based upon the fact that the color balance can be determined by utilizing the clear, unexposed, and processed portion of the negative. The picture itself is not used. It has been found that if one uses the proper filtration as to produce a neutral grey after exposure of the unexposed portion of the negative onto a paper or transparency, subsequent prints of the negatives on that roll will have the correct color balance if the same filtration is used.

BRIEF DESCRIPTION OF THE DRAWING AND THE PREFERRED EMBODIMENT

According to one embodiment of the invention, use is made of a simple filter step tablet especially designed to determine the filter pack necessary to produce a neutral grey. Such a step tablet is shown in FIG. 1 of the drawing. As seen in FIG. 1, the step tablet consists of a series of spaced, horizontally aligned color compensating magenta filter strips overlapped by a series of spaced, vertically aligned color compensating yellow filter strips. The two series are arranged in five steps of increased color density in multiples of 10 from CC10 to CC50. The latter color density filter (CC50) is the highest color density filter commercially available. As can be seen from FIG. 1, each overlapped area of the filter step tablet represents a particular color filter combination. It must then be determined which overlapped area or color filter combination is capable of producing a neutral grey when the clear, unexposed, and developed portion of the color photographic emulsion is exposed through the filter step tablet onto the printing medium and the print is developed.

Figure 2:
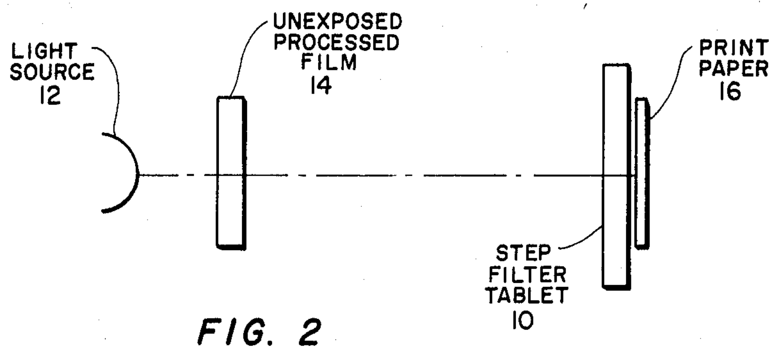

The latter determination can be conveniently carried out as shown in FIG. 2. That is, the filter step tablet 10 of FIG. 1 is placed in contact with the paper or transparency 16 to be printed. The clear, unexposed, and developed portion of the negative 14 is placed in the negative holder of the enlarger (not shown) and an exposure is made from a light source 12 through the filter step tablet 10 onto the printing medium 16. Exposures can be made at several *f*/stop settings of the enlarger if the operator is not sure of the proper exposure. The prints are then developed, and the overlapped areas matched visually against a grey card standard that is known to be neutral. Alternatively, the images can be scanned with a densitometer to determine the densities of the image to red, blue and green light. The color filter combination that produces the neutral grey is the color pack that is placed in the enlarger head to be used for printing the pictures on the roll. The same filter combination used in the step tablet should also be used in the printing enlarger head. For example, if the step tablet is made of multiples of CC10 filters, the light source should use multiples of 10 filters, etc. It is to be understood that the particular filter step tablet described above is merely exemplary of a filter step tablet that can be used in this embodiment. Other modifications such as the use of CC red filters or combinations of CC yellow, CC magenta, CC green or CC cyan filters of high and low densities are seen as coming within the scope of the invention. All that is required is that the particular color filter combination used be capable of producing a neutral grey when the clear, unexposed, and developed portion of the color photographic emulsion is exposed onto the printing medium and the print developed.

If a larger range of overlapped areas or color filter combinations is desired, additional color compensating filter strips of varying densities from CC10 to CC50 can be used as overlapping layers in the formation of the filter step tablet. In general however, it is most desirable to form a filter step tablet having the widest range of overlapped areas or color filter combinations with the least number of filter layers. In fact, a step tablet with a wide range of squares or color filter combinations can be made using only 2 layers of filter strips using combinations of CC red and CC yellow or CC red and CC magenta filter strips. A similar step tablet can be made using CC green filter strips in combination with CC cyan and CC yellow filter strips. In addition, a step tablet using CC blue filter strips can be made in combination with CC cyan and CC magenta.

The method can be used for any kind of negative, paper, transparency processing chemistry, etc. The operator need not know anything about color balance—he can even be color blind—the method has been used successfully to produce prints of Agfa negatives on Agfa paper, Agfa negatives on Ektacolor paper, Kodacolor negatives on Agfa paper, Kodakcolor negatives on Ektacolor Paper, Ektacolor Waterproof Paper, and Ektacolor Transparencies. The system enables one to make color prints without sophisticated photometers, or even processing controls. Mistakes in processing of the negative can be corrected at the time of printing by the proper color balance.

In another embodiment of the invention, light from the printing device is used to expose the unexposed, processed negative through a step tablet or wedge using red, green and blue filters. Wratten 25A—red, Wratton 99—green, and Wratten 98—blue, are good examples of the filters. Light from the printing device is used to expose a step wedge through red, green, and blue filters. The densities on the step tablet required to yield equal densities of red, blue, and green are determined and these densities are used to determine the relative exposures of red, blue, and green required for color balance.

Any of the commonly used methods for color evaluation can also be applied to the methods described in this invention, so that if one knows the color balance required for a particular negative using a fixed processing print chemistry, fixed processing conditions, and fixed printing paper or transparency, one can predict the color balance required for a second or unknown negative.

That is, an extremely accurate color rendition of the original can be obtained if the unexposed processed portion rather than the exposed portion of the negative is used. First, one determines for one negative the filter combination that will produce equal densities to red, blue, and green light on the print for the specific printing paper that one plans to use. The densities of this unexposed, processed portion of the negative to red, blue, and green light are then read on any color densitometer. Then, the red, blue, and green densities in the unexposed but processed portion of the second negative are read on the desitometer. From these data one can accurately predict the filter pack that must be used for the second film. Both the additive and substractive systems can be used with this method. An illustration of such a case is as follows:

Assume that the proper filter balance for obtaining grey with Kodacolor film required the use of a filter pack consisting of 60 Magenta and 40 Yellow. We want to predict the correct color balance for Ektacolor Negative. The densitometer readings for Kodacolor base (fog levels) is as follows:

| | Cyan dye Red | Magenta dye Green | Yellow dye Blue |
|---|---|---|---|
| Density fog level (Kodacolor) | 0.17 | 0.78 | 1.05 |
| To this value we add the estimated filtration used for correct color balance | +0.00 | [1] 0.60 | [2] 0.40 |
| The total represents the total amount of dye in the negative and filter pack | 0.17 | 1.38 | 1.45 |
| Density fog level (Ektacolor) | 0.20 | 0.86 | 0.96 |
| These figures are subtracted from those above | −0.30 | 0.52 | 0.49 |
| The cyan value is made equal to zero | +0.30 | +0.03 | +0.03 |
| The filters for Ektacolor would be | | 0.55 | 0.52 |
| | | [1] 55 | [2] 52 |

[1] Magenta.
[2] Yellow.

The same procedures can be used with the additive system. All of the other devices used for predicting color filter packs from a known filter pack for one kind of paper and processing system are related to the method described above and can therefore be used more accurately with the unexposed portion of the negative.

I wish it to be understood that I do not desire to be limited to the exact details of construction as described for obvious modifications will occur to a person skilled in the art.

What is claimed is:

1. Method of determining the correct color balance required for making color prints in color photography from a color negative including the steps of
   (A) placing a filter step tablet in contact with the paper to be printed,
   (B) exposing the clear, unexposed, and developed portion of the color negative through the filter step tablet onto the printing medium,
   (C) developing the print, and
   (D) scanning the images with a densitometer to determine the filtration required to yield equal densities in the print to red, blue, and green light.

2. Method of determining the correct color balance required for making color prints in color photography from a first and second color negative using a fixed processing print chemistry, fixed processing conditions, and fixed printing paper, said method including the steps of
   (A) printing the unexposed but processed portion of the first color negative with the correct filtration required to yield equal densities in the print to red, blue, and green light, and reading the densities to red, blue, and green light on a color densitometer,
   (B) reading the red, blue, and green densities in the unexposed but processed portion of the second color negative on the color densitometer, and
   (C) using the density data obtained from steps (A) and (B) to predict the correct filtration required for the second color negative.

References Cited

UNITED STATES PATENTS

| | | | |
|---|---|---|---|
| 3,011,388 | 12/1961 | Baumbach et al. | 355—35 X |
| 3,217,594 | 11/1965 | Simmon | 355—35 X |
| 3,529,519 | 9/1970 | Mitchell | 355—32 X |

SAMUEL S. MATTHEWS, Primary Examiner
R. A. WINTERCORN, Assistant Examiner

U.S. Cl. X.R.

96—2, 24; 355—35, 77

PO-1050
(5/69)

UNITED STATES PATENT OFFICE
CERTIFICATE OF CORRECTION

Patent No. 3,672,766 Dated June 27, 1972

Inventor(s) Marilyn Levy

It is certified that error appears in the above-identified patent and that said Letters Patent are hereby corrected as shown below:

Column 1, at line 49, before "correct", change "The" to -- To -- .

Column 1, at line 50, change "enlarged" to -- enlarger -- .

Column 2, at line 2, change "som" to -- some -- .

Column 2, at line 5, change "magneta" to -- magenta -- .

Column 2, at line 18, change "experience" to -- experienced -- .

Column 2, at line 19, change "migh" to -- might -- .

Column 2, at line 20, after "obtained" insert a -- period (.) -- .

Column 2, at line 35, change "manufactureres" to -- manufacturers -- .

Column 2, at line 44, change "sensitivce" to -- sensitive -- .

Column 5, at line 22, change "desitometer" to -- densitometer -- .

Column 5, at line 24, change "substractive" to -- subtractive -- .

Column 5, at line 42, change "-0.30" to -- 0.03 -- .

Column 5, line 43, change "+0.30" to -- +0.03 -- .

Signed and sealed this 10th day of April 1973.

(SEAL)
Attest:

EDWARD M.FLETCHER,JR.
Attesting Officer

ROBERT GOTTSCHALK
Commissioner of Patents